United States Patent [19]

Rohr

[11] Patent Number: 4,635,427
[45] Date of Patent: Jan. 13, 1987

[54] METHOD FOR LOADING A CONTAINER WITH RODS OF NUCLEAR REACTOR FUEL ASSEMBLIES CONTAINING NUCLEAR FUEL OR NEUTRON ABSORBER MATERIAL, AND DEVICE FOR PERFORMING THE METHOD

[75] Inventor: Franz Rohr, Erlangen, Fed. Rep. of Germany

[73] Assignee: Siemens Aktiengesellschaft, Berlin and Munich, Fed. Rep. of Germany

[21] Appl. No.: 553,703

[22] Filed: Nov. 21, 1983

[30] Foreign Application Priority Data

Nov. 19, 1982 [DE] Fed. Rep. of Germany ....... 3242878

[51] Int. Cl.$^4$ ............................................. B65B 5/00
[52] U.S. Cl. ...................................... 53/475; 53/236; 53/246; 53/247; 53/260
[58] Field of Search ................. 53/236, 246, 247, 255, 53/260, 262, 263, 443, 444, 475; 376/261, 262, 264, 271, 272

[56] References Cited

U.S. PATENT DOCUMENTS

| 3,356,578 | 12/1967 | Dryland | 376/262 X |
| 3,555,770 | 1/1971 | Rowekamp | 53/247 X |
| 3,768,668 | 10/1973 | Sckukei | 376/262 |
| 3,925,965 | 12/1975 | Rushworth | 53/255 X |
| 4,030,973 | 6/1977 | Hoffmeister et al. | 376/262 |
| 4,134,789 | 1/1979 | Aubert | 376/262 X |
| 4,358,421 | 11/1982 | Jabsen | 376/271 X |
| 4,474,727 | 10/1984 | Kmonk | 53/246 X |

FOREIGN PATENT DOCUMENTS 2031217 4/1980 United Kingdom ............... 376/261

Primary Examiner—John Sipos
Assistant Examiner—Steven P. Weihrouch
Attorney, Agent, or Firm—Herbert L. Lerner; Laurence A. Greenberg

[57] ABSTRACT

A method for loading a container with rods of nuclear reactor fuel assemblies having mutually parallel longitudinal axes and containing nuclear fuel or neutron absorption material, which includes the steps of loading the container initially with dummies corresponding to the rods in a given dense packing arrangement, and thereafter inserting the rods in axial direction thereof into the given dense packing arrangement so as to replace the dummies; and a device for carrying out the method.

4 Claims, 11 Drawing Figures

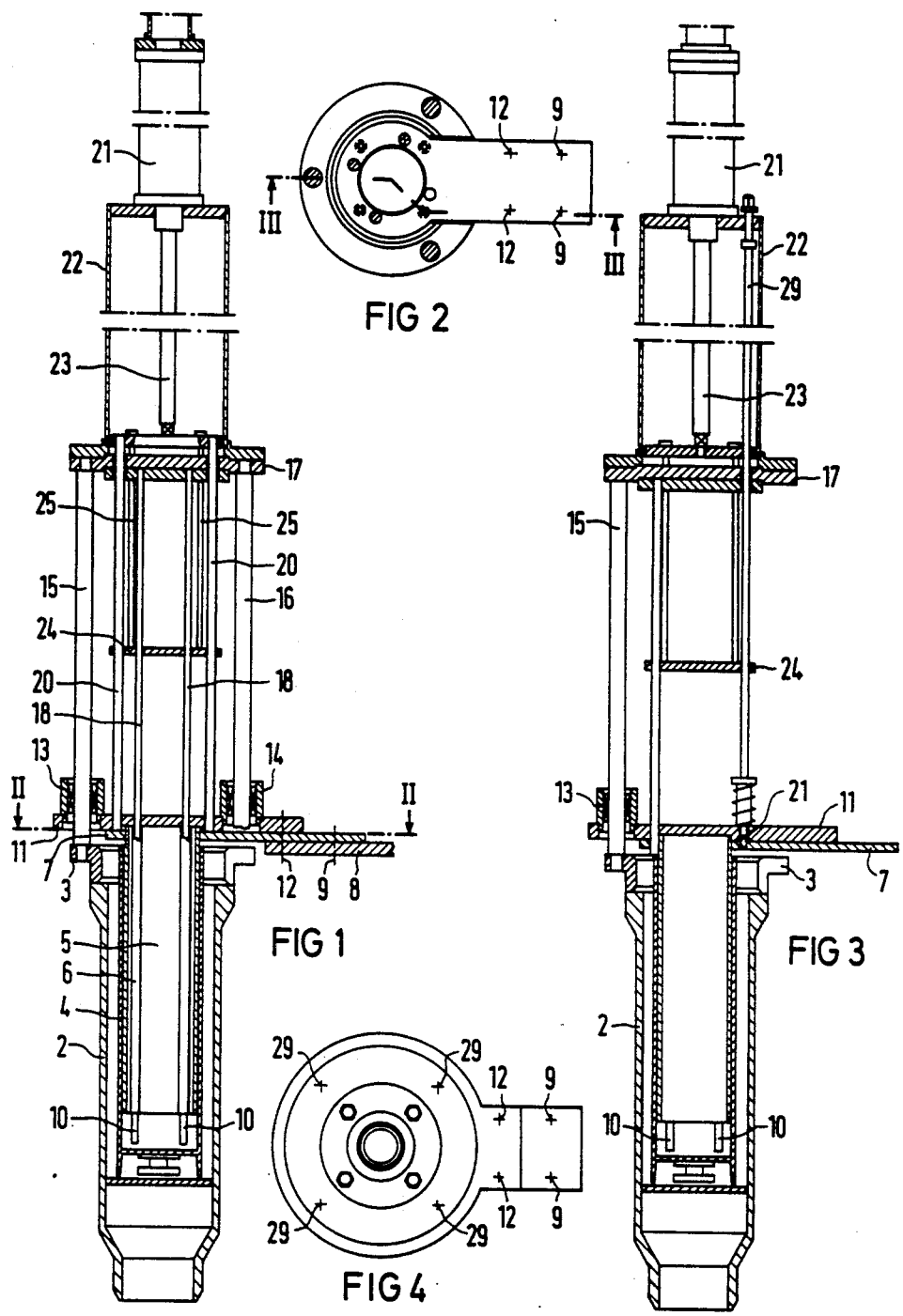

METHOD FOR LOADING A CONTAINER WITH RODS OF NUCLEAR REACTOR FUEL ASSEMBLIES CONTAINING NUCLEAR FUEL OR NEUTRON ABSORBER MATERIAL, AND DEVICE FOR PERFORMING THE METHOD

The invention relates to a method for loading a container with rods of nuclear reactor fuel assemblies containing nuclear fuel or neutron absorber or absorption material and, more particularly, wherein the rods have mutually parallel longitudinal axes, and devices for carrying out this method.

It is an object of the invention to provide such a method and device which utilizes the volume of the container optimally when loading and, thereby, keeps the cost for filling, transporting and/or storage of the rods containing nuclear fuel or neutron absorption material as low as possible.

With the foregoing and other objects in view, there is provided in accordance with the invention, a method for loading a container with rods of nuclear reactor fuel assemblies having mutually parallel longitudinal axes and containing nuclear fuel or neutron absorption material, which comprises the steps of loading the container initially with dummies corresponding to the rods in a given dense packing arrangement, and thereafter inserting the rods in axial direction thereof into the given dense packing arrangement so as to replace the dummies.

In accordance with another mode of the invention the dummy loading step includes inserting the tube bundle assembled in the given dense packing arrangement into the container, and the rod inserting step includes inserting the rods respectively into each of the tubes of the tube bundle, and then withdrawing the tube bundle from the container on hold-down rods respectively extending into each of the tubes of the tube bundle.

In accordance with a further mode of the method invention the dummies are bars inserted into the container in the given dense packing arrangement, and which includes withdrawing the bars in succession and replacing them with the fuel assembly rods.

In accordance with an added mode of the method invention an auxiliary plate is screwed to the upper end of the dummy bars prior to inserting the dummy bars into the container, and the dummy bars pass through a guide plate so that the lower end of the dummy bars project beyond the guide plate and the guide plate is movable along the dummy bars.

In accordance with another aspect of the invention, there is provided a device for loading a container with rods of nuclear reactor fuel assemblies having mutually parallel longitudinal axes and containing nuclear fuel and neutron absorption material, respectively, comprising a holding basket wherein the container is received, a tube bundle in turn received in the container, a holding plate having an underside disposed adjacent the holding basket, the holding plate being connectible at the underside thereof to the tube bundle and being displaceable on vertical guide rods in longitudinal direction of the guide rods, and hold-down rods disposed parallel to the guide rods and extending through the holding plate, the hold-down rods being stationary relative to the guide rods.

In accordance with yet another aspect of the invention, there is provided a device for loading a container with rods of nuclear reactor fuel assemblies having mutually parallel longitudinal axes and containing nuclear fuel and neutron absorption material, respectively, comprising a holding basket wherein the container is received, a flange plate disposed above and adjacent the holding basket and being formed with a passageway opening having a contour corresponding to that of a given dense packing arrangement for fuel assembly rods to be loaded in the container, and dummy bars assembled in the given dense packing arrangement and received in the holding basket through the passageway opening, the dummy bars being held by the flange plate.

The dummies matching the fuel assembly rods can be made very much more rugged than the rods themselves which, usually, are relatively long and have a relatively thin-walled cladding into which the nuclear fuel or the neutron absorber material is filled, and which therefore can be damaged easily when handled by remote control under water. By preshaping the dense packing in the container with the aid of the rugged dummies, damage to the rods during the subsequent replacement of the dummies by the rods is prevented to the greatest extent. By exchanging the dummies for rods, it is even possible to load the container with rods containing nuclear fuel or neutron absorber material in a dense packing arrangement which were provided, theretofore, as part of a nuclear-reactor fuel assembly in an operating nuclear reactor and are bent due to the stress in that nuclear reactor.

Other features which are considered as characteristic for the invention are set forth in the appended claims.

Although the invention is illustrated and described herein as embodied in a method for loading a container with rods of nuclear reactor fuel assemblies containing nuclear fuel or neutron absorber material, and devices for performing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a longitudinal sectional view of a device for loading a container with rods of nuclear reactor fuel assemblies containing nuclear fuel or neutron absorption material according to the invention.

FIG. 2 is a cross-sectional view of FIG. 1 taken along the line II—II in direction of the arrows;

FIG. 3 is a longitudinal sectional view of FIG. 2 taken along the line III—III in direction of the arrows;

FIG. 4 is a top plan or end view of FIG. 1;

Figure 5:
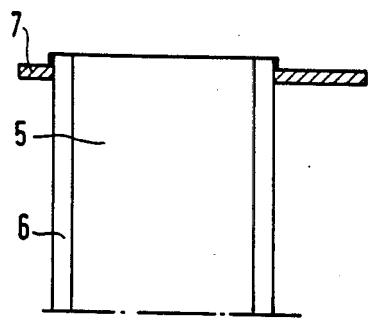
FIG. 5 is an enlarged, fragmentary longitudinal sectional view of FIG. 1.

Referring now to the drawing and first, particularly, to FIGS. 1 to 6 thereof, there is shown an embodiment of the device according to the invention disposed in a pit filled with water, which is not otherwise specifically illustrated. The device includes a holding basket 2 which has a substantially hollow-cylindrical shape and is fastened, with a vertical longitudinal axis, onto the bottom of the pit. The holding basket 2 is open at the upper end thereof.

Near the upper end of the holding basket 2 there is further arranged in the pit a horizontal support plate 8 having an upper side somewhat higher than the upper end of the holding basket 2, which is fastened in a non-illustrated manner in the pit fixed in position relative to the holding basket 2.

Figure 6:
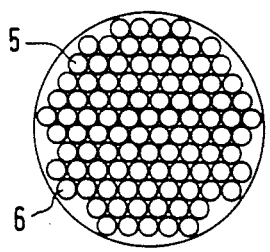
FIG. 6 is a top plan or end view of FIG. 5.
Figure 7:
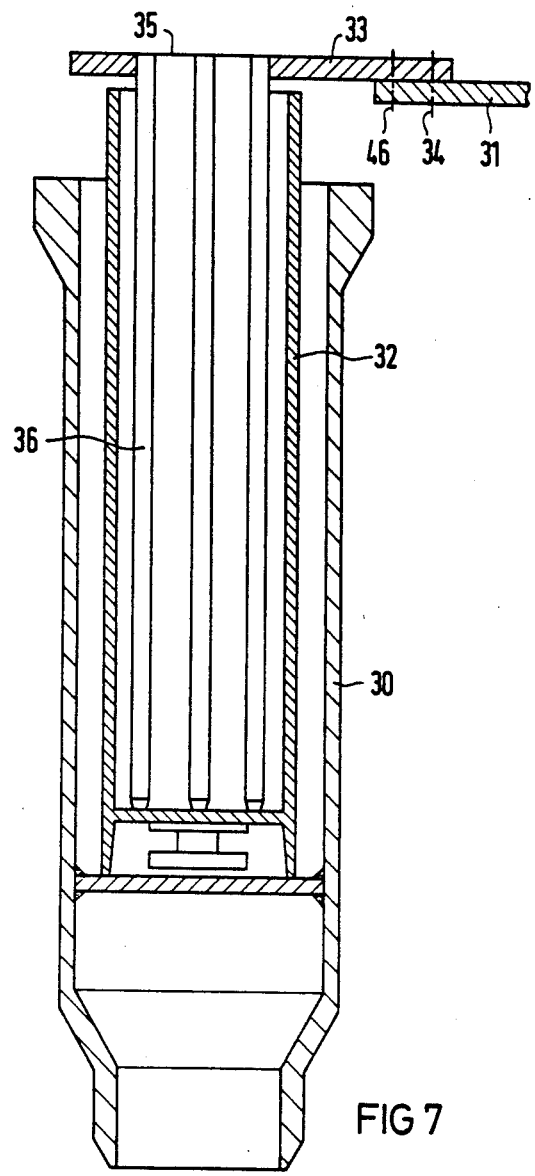
FIG. 7 is an enlarged, fragmentary longitudinal sectional view of another embodiment of the device for performing the method according to the invention.
Figure 8:
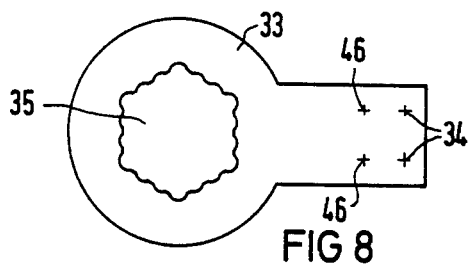
FIG. 8 is a fragmentary top plan or end view of the device according to FIG. 7.
Figure 9:
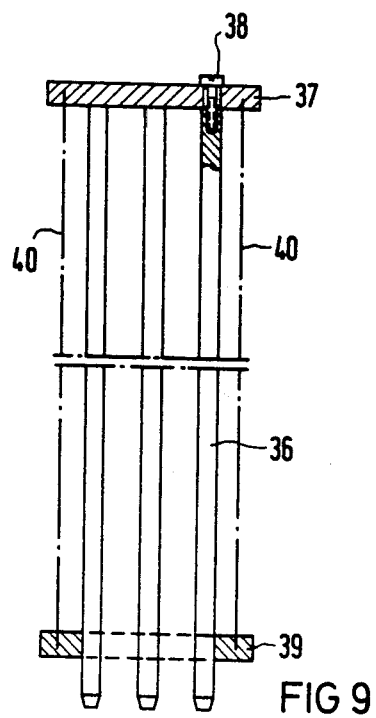
FIG. 9 is a fragmentary longitudinal sectional view of the device according to FIG. 7.
Figure 10:
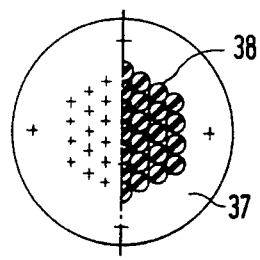
FIG. 10 is a top plan or end view of FIG. 9, half of which is shown diagrammatically.

In an open upper-ended hollow-cylindrical transport container 4 for rods containing nuclear fuel or neutron absorption material, a dummy for these rods is initially inserted formed of a tube bundle 5 shown in FIGS. 5 and 6, the individual tubes of which are thin-walled and all thereof having the same inside and outside diameter and being welded together at the outside thereof, with a mutually parallel longitudinal axis, so that they form a very dense hexagonal packing with a longitudinal axis parallel to the longitudinal axis of the transport container 4. A flange 7 is welded to the upper end of this tube bundle 5 which is made up of tubes 6, the flange 7 having a feedthrough or passageway formed therein through which the upper ends of the tubes 6 extend.

The transport container 4 is then set down coaxially in the holding basket 2 i.e. with a vertical longitudinal axis thereof coinciding with the corresponding axis of the holding basket 2. Thereafter, the flange 7 of the tube bundle 5 which rests flatly against the upper side of the support plate 8, is precentered with two centering pins 12 and bolted to the support plate 8 by screws 9. Then a rod for example, irradiated, containing nuclear fuel or neutron absorption material is inserted vertically from above through the upper opening of the transport container 4 by means of an otherwise non-illustrated fuel rod exchanging device into each of the tubes 6 of the tube bundle 5 in the transport container 4, until this irradiated rod is located completely within the transport container 4.

After the tubes 6 of the tube bundle 5 are filled with rods, a holding plate 11 is placed with the underside thereof flatly upon the upper side of the flange 7, centered by the centering pins 12 and bolted to the flange 7 by means of screws 29.

The mounting plate 11 which, on the underside thereof, has an adjusting tray or trough for the upper end of the tube bundle 5, is movable by means of ball bushings 13 and 14 on vertical guide rods 15 and 16 in longitudinal direction of these guide rods 15 and 16. In FIG. 1, the guide rod 16 is shown offset 60° relative to the central longitudinal axis of the holding basket 2. An open mounting ring 3 is fastened to the lower ends of the guide rods 15 and 16 and is seated, centered, on the open upper end of the holding basket 2. The guide rods 15 and 16 are fastened at the upper ends thereof to a common support body 17 to which also hold-down rods 18 are fastened by the upper ends thereof parallel to the guide rods 15 and 16, the lower ends of the hold-down rods 18 projecting through the mounting plate 11. The number of these hold-down rods 18 corresponds to the number of the tubes 6 in the tube bundle 5. Each of these hold-down rods 18 is aligned with one of the tubes 6 of the tube bundle 5.

Two tie rods 20 which are parallel to the guide rods 15 and 16 project through the support body 17 and are screwed to the mounting plate 11 at the lower end thereof. The upper ends of the tie rods 20 which project through the support body 17 are fastened to the lifting piston of a lifting cylinder 21 which, in turn, is attached to the upper end of a hollow cylindrical body 22, to the lower end of thich the support body 17 is fastened and in which the piston rod 23 of the lifting piston, fastened to the upper ends of the tie rods 20, is guided.

Each of the hold-down rods 18 extends additionally through a centering plate 24 which is movable on these hold-down rods 18. The centering plate 24 is suspended from two rods 25 which are movable through the support body 17 and which prevent buckling of the hold-down rods 18 during assembly.

After the mounting ring 3 is placed upon the holding basket 2, and the mounting plate 11 upon the flange 7, this flange 7 is bolted to the mounting plate 11 by means of screws 29 parallel to the guide rods 15 and 16, while the screws 9 between the flange 7 and the support plate 8 are loosened. The screws 29 extend movably in longitudinal direction through the support body 17 and the hollow cylindrical body 22.

By actuating the lifting piston in the lifting cylinder 21, the tube bundle 5 is then withdrawn upwardly vertically out of the transport container 4 by means of the flange 7 bolted to the mounting plate 11, while the hold-down rods 18, which are aligned with the tubes 6 of the tube bundle 5, hold back the rods 10 which are filled with nuclear fuel or neutron absorber material, in the very dense hexagonal packing in the transport container 4. In this regard, the tube bundle 5 finally also moves the centering plate 24 vertically upwardly.

After the lifting cylinder 21 is lifted with the mounting plate 11 to which the tube bundle 5 is mounted, and with the mounting ring 3 of the holding basket 2, the water can be sucked out of the transport container 4 by placing a hood upside down onto the upper end of the transport container 4 and a lid can be welded into the opening at the upper end of this transport container 4 in a gas-tight and liquid-tight manner. Thereupon, the transport container 4 is ready for transport.

In the device according to FIGS. 7 to 11, a holding basket 30 is fastened to the bottom of the pit in a manner similar to the device according to FIGS. 1 to 6, a stationary support plate 31 being associated with the holding basket 30. A flange plate 33 is centered flatly on the upper side of the support plate 31 by means of centering pins 46, and is screwed tight by means of screws 34. As can be seen from FIG. 8, which shows a top plan view of this flange 33, the latter has a feedthrough or passageway 35, formed with a contour which corresponds to the contour of the rods which are arranged in the transport container 32 in the very dense hexagonal packing and contain nuclear fuel or neutron absorber material.

After the transport container 32 is deposited in the holding basket 30, the flange plate 33 is firmly bolted to the support plate 31, so that the feedthrough or passageway 35 is aligned with the opening at the upper end of the transport container 32.

Then, rods 36 are inserted as dummies through the feedthrough or passageway 35 vertically from above into the transport container 32, the rods 36 having the same diameter as the rods to be inserted into the transport container 32. The rods 36 are screwed, in the very dense hexagonal packing at the upper ends thereof, to the underside of an auxiliary plate 37 by respective screws 38 which extend through the auxiliary plate 37 and are manipulatable on the upper side of the auxiliary plate 37. The lower ends of the mutually parallel rods 36 project through a feedthrough or passageway in a guide plate 39 which holds these lower ends in the very dense hexagonal packing and which is fastened, in turn, to holding rods 40 which are parallel to the rods 36, and which are movable through the auxiliary plate 37 in the longitudinal direction thereof. After the rods 36 are inserted into the transport container 32, the guide plate 39 and the auxiliary plate 37 lie on the upper side of the flange plate 33 and can be lifted vertically upwardly after the screws 38 have been loosened or detached from this flange plate 33.

Figure 11:
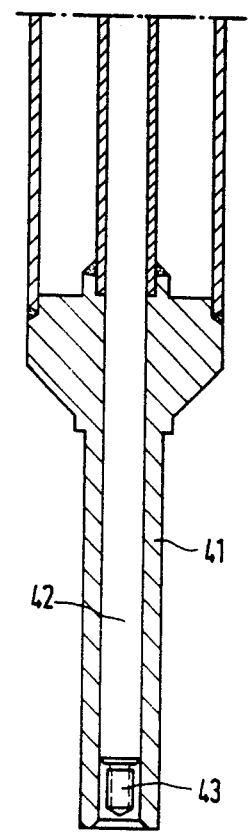
FIG. 11 is a longitudinal sectional view of a tool associated with the device according to FIG. 7.

With a pulling tool according to FIG. 11, which has a vertical receiving sleeve 41 wherein a pulling rod 42 is guided, the pulling rod 42 having at the lower end thereof a thread 43, a respective rod 36 is pulled out of the transport container 32 and relaced by a rod containing nuclear fuel or neutron absorber material. To this end, the pulling tool is arranged vertically above the feedthrough or passageway 35 in the flange plate 33, the pulling rod 42 is screwed to the respective rod 36, and this rod 36 is pulled into the receiving cylinder 41 of the pulling tool. When such a rod 36 is withdrawn from the transport receiver 32, adjacent rods 36 and the adjacent rods already inserted into the transport container 32, respectively, are held back in the transport container 32 with the lower end of the receiving sleeve 41 of the pulling tool. After a rod 36 is pulled out of the transport container 32, a rod containing nuclear fuel or neutron absorber material is inserted by means of a non-illustrated rod exchanging device in place of the withdrawn rod 36 into the transport container 32. After all of the rods 36 in the transport container 32 have been replaced in this manner by rods containing nuclear fuel or neutron absorber material which are shorter than the rods 36 and therefore no longer extend through the flange plate 33, the latter can be unscrewed and lifted from the support plate 31.

As was described hereinbefore in connection with the device according to FIGS. 1 to 6, a lid can be welded in a gas-tight and water-tight manner also in the opening at the upper end of the transport container 32 in the device according to FIGS. 7 to 11 after water has been sucked out of the transport container 32. Thereupon, the transport container 32, wherein the rods containing nuclear fuel or neutron absorber material are arranged in the very dense hexagonal packing, is ready for transport.

A further advantage of the invention is that the transport containers 4 and 32, respectively, into which rods containing nuclear fuel or neutron absorber material are inserted by the method according to the invention in the very dense hexagonal packing, contain no additional structural materials of any kind.

The foregoing is a description corresponding in substance to German Application No. P 32 42 878.2, dated Nov. 19, 1982, the International priority of which is being claimed for the instant application, and which is hereby made part of this application. Any material discrepancies between the foregoing specification and the aforementioned corresponding German application are to be resolved in favor of the latter.

I claim:

1. Method of loading a container with rods of nuclear reactor fuel assemblies having mutually parallel longitudinal axes and containing nuclear fuel or neutron absorption material, which comprises the steps of loading the container initially with a multiplicity of dummies corresponding to the rods in a given dense packing arrangement, and thereafter inserting the rods in longitudinal direction thereof into the given dense packing arrangement in place of the dummies; wherein the dummy loading step includes inserting a bundle of tubes in the given dense packing arrangement into the container, and the rod inserting step includes inserting the rods respectively into each of the tubes of the tube bundle, partially extending hold-down rods into tubes of the tube bundle and then withdrawing the tube bundle from the container over and onto respective hold-down rods extending into each of the tubes of the tube bundle.

2. Method of loading a container with the rods of nuclear reactor fuel assemblies having mutually parallel longitudinal axes and containing nuclear fuel or neutron absorption material, which comprises the steps of loading the container initially with a multiplicity of dummies corresponding to the rods in a given dense packing arrangement, and thereafter inserting the rods in longitudinal direction thereof into the given dense packing arrangement in place of the dummies, wherein the dummies are bars inserted into the container in the given dense packing arrangement, and which includes withdrawing the bars one after the other and inserting the fuel assembly rods one after the other in place of the bars said insertion occuring after the withdrawal of each dummy bar.

3. Method according to claim 2 which includes screwing an auxiliary plate and one end of the dummy bars to one another prior to inserting the dummy bars into the container, and passing the dummy bars through a passageway formed in a guide plate so that the other end of the dummy bars project beyond the guide plate and the guide plate is movable along the dummy bars.

4. Device for loading a container with rods of nuclear reactor fuel assemblies having mutually parallel longitudinal axes and containing nuclear fuel or neutron absorption material, comprising a holding basket wherein the container is received said holding basket having a longitudinal axis and being secured to the bottom of a pit for water with said longitudinal axis of said holding basket extending in vertical direction, a tube bundle in turn received in the container to receive said fuel rods, a holding plate having an underside disposed adjacent said holding basket, means for releasably connecting said holding plate at said underside thereof to said tube bundle, means for moving said holding plate on vertical guide rods in longitudinal direction of said guide rods, and hold-down rods disposed parallel to said guide rods and extending through said holding plate into said tube bundle, said hold-down rods being stationary relative to said guide rods said means for moving said holding plate removes said tube bundle onto and over said hold-down rods while said hold-down rods hold the fuel rods in said container.

* * * * *